United States Patent [19]

Michalski

[11] 4,080,735

[45] Mar. 28, 1978

[54] SCRAPER BLADE

[75] Inventor: Arnold Michalski, Easley, S.C.

[73] Assignee: Phillips Fibers Corporation, Greenville, S.C.

[21] Appl. No.: 732,246

[22] Filed: Oct. 14, 1976

[51] Int. Cl.² ............................................. B25G 3/00
[52] U.S. Cl. ....................................... 30/345; 30/169; 260/37 R
[58] Field of Search ................ 30/169, 345; 260/37 R

[56] References Cited

U.S. PATENT DOCUMENTS

| 1,704,329 | 3/1929 | Klaus | 30/169 X |
| 2,116,007 | 5/1938 | Bille | 30/345 X |
| 2,380,186 | 7/1945 | Mayer | 30/169 X |
| 2,519,946 | 8/1950 | Voelker et al. | 30/169 X |
| 2,719,316 | 10/1955 | Hauser | 30/169 UX |
| 3,267,516 | 8/1966 | Eckhaus | 30/169 UX |
| 3,341,945 | 9/1967 | Chase | 30/169 |
| 3,354,129 | 11/1967 | Edmonds et al. | 260/79 |
| 3,436,823 | 4/1969 | Lamb et al. | 30/169 |
| 3,521,214 | 7/1970 | Bennett et al. | 338/322 |
| 3,931,672 | 1/1976 | Siden | 30/345 |

FOREIGN PATENT DOCUMENTS

| 629,509 | 9/1949 | United Kingdom | 30/337 |
| 681,383 | 10/1952 | United Kingdom | 30/169 |
| 844,416 | 8/1960 | United Kingdom | 30/169 |

Primary Examiner—Gary L. Smith
Assistant Examiner—J. T. Zatarga

[57] ABSTRACT

A scraper blade comprises poly(arylene sulfide) and carbonaceous filler wherein the amount of poly(arylene sulfide) ranges from about 40 to about 80 percent by weight and the amount of carbonaceous filler ranges from about 60 to about 20 percent by weight.

9 Claims, 3 Drawing Figures

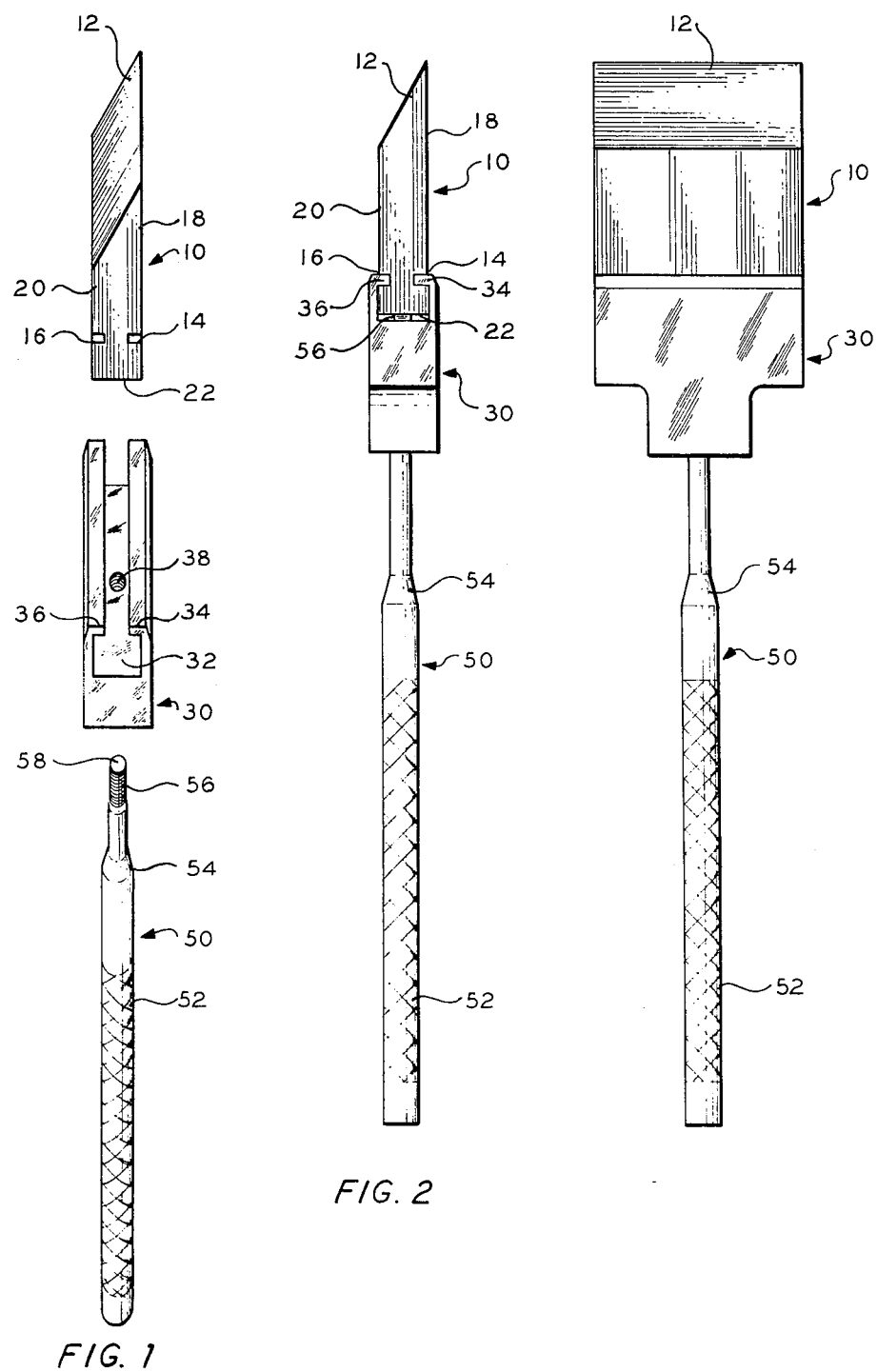

SCRAPER BLADE

BACKGROUND OF THE INVENTION

The invention relates to scraper blades.

In another aspect the invention relates to a scraper blade useful as a wipe stick for cleaning the extrusion face of a spinneret.

Synthetic fibers are generally produced by melt spinning thermoplastic polymers. The thermoplastic polymers are heated to their melting point and then extruded through a plate having a plurality of orifices therein, usually referred to in the art as a spinneret. The filaments are formed as the melted polymer is forced or extruded through the orifices in the spinneret, cooled to a temperature below their melting point and then wound up to form a package of melt spun yarn. This freshly spun yarn is usually drawn to substantially improve its tenacity and textured or bulked by various processes known in the art. It is of course fundamental that the quality of the textured yarn can be no better than the quality of the yarn produced in the melt spinning operation.

One of the problems that frequently occurs during the melt spinning operation is the buildup of melted polymer on the outside face of the spinneret, usually adjacent the orifices. This polymer buildup, if not removed periodically, decomposes and turns very dark in color, and is pulled off in small pieces by the moving melt spun filaments exiting the face of the spinneret. The degraded polymer on the face of the spinneret can also distort the filament cross section which results in a nonuniform yarn or a yarn with a high Uster value. Further some of the degraded polymer pulled from the face of the spinneret ends up as dark specks in the yarn which also results in a nonuniform yarn.

In order to preclude the problems associated with polymer buildup on the face of the spinneret, the spinneret face is periodically wiped with a scraper or a wipe stick to remove any accumulation of polymer therefrom. As known in the art these scrapers or wipe sticks are generally made from a soft metal, such as brass. Although the spinnerets are made from materials generally much harder than brass, such as stainless steel, the brass wipe sticks still damage the outlet region of the spinneret orifices. In the event the brass wipe stick is nicked so as to cause a burr on the wiping edge, it can cause severe damage to the orifices of the spinneret because of the substantial difference in the temperature of the wipe stick as compared to the spinneret. In addition the brass wipe sticks require frequent resharpening of the wiping edge in order for the wiping operation to be effective.

An object of the invention is a scraper blade or a wipe stick that substantially lessens the possibility of damaging the spinneret during the wiping operation.

Another object of the invention is a scraper blade or a wipe stick that does not need to be resharpened nearly as often as a brass scraper or wipe stick.

Another object of the invention is a scraper blade or wipe stick that resists the tendency of the extruded polymer to stick thereto.

SUMMARY OF THE INVENTION

According to the invention a scraper blade comprises poly(arylene sulfide) and carbonaceous filler wherein the amount of poly(arylene sulfide) ranges from about 40 to about 80 percent by weight and the amount of carbonaceous filler ranges from about 60 to about 20 percent by weight.

BRIEF DESCRIPTION OF THE DRAWING

FIG. 1 is an expanded perspective view showing a scraper employing one embodiment of a scraper blade of the present invention.

FIG. 2 is a side view of the assembled scraper shown in FIG. 1, and

FIG. 3 is a front view of the scraper shown in FIGS. 1 and 2.

DETAILED DESCRIPTION OF THE INVENTION

Referring to FIG. 1, there is shown one embodiment of a scraper blade, indicated generally by reference numeral 10, according to the invention. Scraper blade 10 has a tapered edge 12 and two grooves 14 and 16 positioneed on opposite sides of the large flat surfaces 18 and 20, respectively, of blade 10. Blade 10 also has a flat edge 22 on the end of blade 10 opposite edge 12.

Further in accordance with this embodiment, a blade holding member 30 has a U-shaped portion 32 having lips 34 and 36. Blade holding member 30 also has a threaded aperture 38 positioned perpendicular to U-shaped portion 32 on the end opposite lips 34 and 36. Also shown in the drawing is handle 50 having a gripping portion 52 and a tapered portion 54 with a threaded section 56.

As shown in the drawing, and in particular in FIG. 2, scraper blade 10 is inserted in U-section 32 of blade holding member 30 so that lips 34 and 36 slip into slots 14 and 16, respectively. Handle 50 is then threaded into threaded aperture 38 so that the end 58 of handle 50 is pressed against flat edge 22 of blade 10 which in turn forces slots 14 and 16 against lips 34 and 36 thus locking blade 10, blade holding member 30 and handle 50 into a rigid scraper or wipe stick.

In accordance with the invention blade 10 comprises two important components, poly(arylene sulfide) and carbonaceous filler. Further these two components are mixed together in critical proportions to provide a material which when formed into scrapers or wipe sticks will not damage spinneret orifices as will brass wipe sticks and does not require constant resharpening as do brass wipe sticks. Further the specific composition of the scraper blades of this invention have sufficient heat stability to prevent melting of the scraper blades, and particularly the sharpened edge. Also the filaments extruded through the spinneret generally will not stick or adhere to the scraper blades of the present invention. In the development of the present invention, it was found that various poly(arylene sulfide) compositions were unsatisfactory because the extruded filaments tended to stick to the scraper blades made from such compositions during the wiping operation. Also some of the scraper blades did not cleanly wipe the spinneret face.

The scraper blades of the present invention comprise poly(arylene sulfide) in an amount ranging from about 40 to about 80 percent by weight and carbonaceous filler in an amount ranging from about 20 to about 60 percent by weight. Based upon the results of the examples described hereinbelow, good results can be obtained wherein the scraper blades comprise poly(arylene sulfide) in an amount ranging from about 55 to about 65 percent by weight and carbonaceous filler in an amount ranging from about 35 to about 45 percent by weight. For example, good results were obtained employing 60 percent by weight poly(phenylene sulfide) and 40 percent by weight graphite.

Poly(arylene sulfide) polymers generally are suitable for use in the invention. Such polymers are described for example in U.S. Pat. No. 3,354,129 issued to Edmonds Jr. et al on Nov. 21, 1967. One of the more common poly(arylene sulfides) is poly(phenylene sulfide) which is preferred for use in the invention because it is readily available in commercial quantities. Generally polymers used in the invention have melt flows as determined via ASTM D1238-65T at 600° F (315° C) ranging from about zero to about 4000. If the polymer is to be injection molded such polymer should be pretreated to bring the melt flow to a range of from 25 to 200 or if the polymer is to be compression molded, good results can be obtained employing a polymer having a melt flow to about zero.

Carbonaceous fillers suitable for use in the invention include both amorphous and crystalline forms of carbonaceous materials. Some suitable amorphous forms of carbonaceous fillers include carbon blacks such as, for example, thermal blacks, acetylene blacks, furnace blacks and channel blacks. The particle size of the amorphous carbonaceous fillers used in the invention ordinarily ranges from about 1 to about 500 microns; however, good results can be obtained employing carbonaceous fillers having a particle size in the range of from about 50 to about 100 millimicrons. Carbonaceous materials having a particle size within the latter range are preferred because such carbonaceous materials are readily available.

Besides the carbonaceous materials noted above, crystalline carbonaceous materials such as graphite are also useful in the present invention. Good results were obtained employing graphite fibers and they are preferred, although small graphite particles can also be used. The graphite fibers employed in the present invention as described in the examples contained herein were sold by the Union Carbide Corporation, Carbon Products Division, New York, N.Y., under the designation VMA 0.5 inch chopped carbon matt, pitch base. This material is in the form of ½ inch cubes which are broken up when mixed with the polymer as above described in a suitable mixer such as an intensive mixer to produce fibers ranging from about ⅛ inch to ¼ inch long.

The scraper blades of the present invention can be molded by molding techniques well known in the art. The molding should be carried out above the melting point or softening point but below the decomposition point of the particular polymer being molded. Some suitable molding techniques include injection molding, compression molding, etc.

Various methods can be used to mix the carbonaceous filler with the poly(arylene sulfide) as is known in the art. Good results were obtained employing an intensive mixer. After mixing the materials together, if the injection molding technique is used, the mixture is passed to a strand extruder and pelletized, and the pellets are passed to an injection molding machine. If compression molding is used, then the mixture is first heated in air to melt and crosslink the polymer and thus reduce the polymer melt flow to the desired level before placing the mixture in the mold.

EXAMPLE I

Poly(phenylene sulfide) having a 100 melt flow according to ASTM D1238-65T at 600° F (315° C) in the form of unscreened powder, particle size about 5–200 microns, and Union Carbide VMA ½ inch chopped carbon matt of graphite fibers, pitch base, were blended on a weight basis of 60% polymer and 40% graphite in a Henschel intensive mixer. During blending the fibers were substantially reduced to a length ranging from about 0.125 inch (0.32 cm) to about 0.250 inch (0.64 cm). The mixture was placed on a tray in an air oven for 15 hours at 520° F (271° C) and then for one hour at 700° F (371° C) to melt and crosslink the polymer. The mixture then had a melt flow of approximately zero. The polymer was taken from the oven and chopped, placed in a mold 12 inches (30.5 cm) × 12 inches × 1 inch (2.54 cm) thick, and placed in a press at 3000 psi to compact the polymer particles. The mold was taken from the press, placed in an oven, heated until the polymer reached 700° F (371° C), and then put in a press again at 3000 psi and allowed to cool to about 300° F (148.7° C). The blade for a wipe stick was machined from the 12 inches × 12 inches × 1 inch slab. The blade was ¼ inch thick, 1⅜ inches long, and 1¼ inches wide with a tapered edge as shown in the drawing having a slope of 0.5.

The above scraper or wipe stick blade was used over a period of one week to wipe forty spinnerets which were spinning polyethylene terephthalate. The scraper blade made clean wipes without the polyester filaments sticking to the blade and the blade retained its sharpened edge and was still serviceable even after forty wipes. A brass wipe stick had been used previously to wipe the same spinnerets under the same operating conditions; however, only an average of 20 wipes could be made before they had to be resharpened. It is also apparent from this example that the scraper blades of this invention can be compression molded directly instead of machined from a slab or sheet of the material.

EXAMPLE II

Three scraper blades were made outside the scope of the invention employing poly(phenylene sulfide) alone or with various fillers as specified below.

(1) One blade had a composition on a weight basis of 50% poly(phenylene sulfide), 45% asbestos fibers 1/16 inch (0.158 cm) to ⅛ inch (0.317 cm) long and 5% graphite fibers as used in Example I. The same mixing and molding process used in Example I was employed. The shape and size of the scraper blade was comparable to that of Example I. The scraper blade was used as a wipe stick and tested by wiping a spinneret spinning polyester filaments. Although the blade cleaned the polymer from the spinneret face the sharpened edge of the blade became dull after wiping only one spinneret and the polyester filaments stuck to the blade which caused extra operator time to clean the polymer from the scraper blade.

(2) A second scraper blade was prepared from 100% unfilled poly(phenylene sulfide) the same as that used in Example I. The polymer was cured by heating 15 hours at 520° F followed by 3½ hours at 700° F. The size and shape of the scraper blade was comparable to that of Example I. The scraper blade was used as a wipe stick and tested by wiping a spinneret spinning nylon fibers. The scraper blade did not remove the polymer deposits from the spinneret face satisfactorily and the nylon fibers tended to stick to the blade.

(3) A scraper blade was prepared from 60% by weight poly(phenylene sulfide) as used in Example I and 40% by weight asbestos fibers as described in Example II. Again the scraper blade was prepared employing the procedure of Example I and the blade had the same size and shape as the scraper blade of Example I. The scraper blade was used as a wipe stick and tested by wiping a spinneret spinning polyester fibers. The polyester fibers tended to stick to the blade.

This example clearly illustrates that scraper blades made using a poly(arylene sulfide), such as poly(phenylene sulfide), are not necessarily satisfactory whether the polymer is unfilled or combined with asbestos or asbestos and graphite in the percentages employed.

EXAMPLE III

A scraper blade was made within the scope of the invention employing the same mixture as that of Example I. After the mixture was well blended in the Henschel intensive mixer, the mixture was extruded in a strand extruder, quenched in water and cut into pellets. The pellets were fed to a Van Dorn injection molding machine to produce a 4 inches (10.16 cm) × 8 inches (20.32 cm) × 0.250 inch (0.63 cm) slab from which a scraper blade was machined having the size and shape of the scraper blade of Example I. The scraper blade was used as a wipe stick and tested as in the previous examples. The scraper blade produced excellent results in all respects.

This example illustrates that although the scraper blades of this example were machined from an injection molded slab it is apparent that the scraper blades can be directly molded by using the injection molding technique.

The scraper blades of the present invention produce very good results when used as wipe sticks to wipe extrusion spinnerets. As compared to brass wipe sticks, the scraper blades of the present invention last at least twice to three times as long as brass wipe sticks before resharpening is necessary. Further, the scraper blades of the present invention will not form burrs on the sharpened edge as do brass wipe sticks which can cause serious damage to the spinneret.

Although the scraper blades of the present invention were developed for use in wipe sticks as previously described, it is contemplated that they will be suitable for other applications which require a smooth, burr-free scraper surface.

I claim:

1. A scraper blade for cleaning the extrusion face of a spinneret used for spinning polyethylene terephthalate comprising poly(arylene sulfide) and carbonaceous filler wherein the amount of poly(arylene sulfide) ranges from about 40 to about 80 percent by weight and the amount of carbonaceous filler ranges from about 60 to about 20 percent by weight so that said scraper blade resists the tendency of the extruded molten polymer to stick thereto, said scraper blade being in the form of a plate having an edge tapered to produce a sharpened edge.

2. The scraper blade of claim 1 further comprising a handle attached to said blade and extending outwardly from the plate opposite said sharpened edge.

3. The scraper blade of claim 1 wherein the amount of poly(arylene sulfide) ranges from about 55 to about 65 weight percent and the amount of carbonaceous filler ranges from about 35 to about 45 weight percent.

4. The scraper blade of claim 1 wherein the poly(arylene sulfide) is poly(phenylene sulfide).

5. The scraper blade according to claim 1, wherein the poly(arylene sulfide) used to produce said scraper blade has a melt flow ranging from about 0 to about 4000 according to ASTM 1238-65T at 600° F (315° C).

6. The scraper blade according to claim 1 wherein the carbonaceous filler is graphite fibers.

7. The scraper blade according to claim 1 wherein the carbonaceous filler is graphite fibers in the form of chopped carbon matt having a pitch base.

8. The scraper blade according to claim 1 produced by injection molding.

9. The scraper blade according to claim 1 produced by compression molding.

* * * * *